April 20, 1937.   J. C. CROWLEY   2,078,062
VALVE STEM
Filed Nov. 24, 1933

INVENTOR:
JOHN C. CROWLEY
Kurio Hudson & Kent
ATTORNEYS

UNITED STATES PATENT OFFICE 2,078,062

VALVE STEM

John C. Crowley, Cleveland Heights, Ohio, assignor to The Dill Manufacturing Company, Cleveland, Ohio, a corporation of Ohio Application November 24, 1933, Serial No. 699,536

2 Claims. (Cl. 152—12)

This invention relates to a valve stem such as is used in the inner tube of a pneumatic tire, although, of course, valve stems of this character are often employed in other inflatable articles.

An object of the invention is to provide a valve stem which is so constructed that, when pressure fluid is passed through the stem into the article carrying the same, the said fluid will be diffused as it leaves the inner end of the stem bore as distinguished from passing out of the bore in a single concentrated stream or jet.

A more specific object is to provide a valve stem the base of which is so constructed that, when the stem is used in a molded tire tube and during the curing operation, the high-pressure air or steam used during such operation will be diffused as it leaves the inner end of the stem bore and will not form thin spots in the tube.

Further and additional objects and advantages of the invention will become apparent hereinafter during the following detailed description of several embodiments thereof, which embodiments are illustrated in the accompanying drawing wherein.

The inner tubes of pneumatic tires are, at the present time, generally manufactured by a continuous molding process wherein the valve stems for the tubes have their bases molded into the tubes during the manufacturing process. The molded tubes are cured by inflating the same with high-pressure air or by means of steam, while the tubes are still hot and are in the molds. The injection of the high-pressure fluid into the tubes through the valve stems causes a jet or concentrated stream of the fluid to leave the inner end of the valve stem bore and strike the inner surface of the tube directly opposite the base of the valve stem. This jet or stream of high-pressure fluid striking the still hot uncured rubber of the tube forces the rubber to flow away from the point at which the jet strikes the tube and results in creating a thin weakened spot in the tube which is liable to subsequently blow out when the tube is used in a pneumatic tire.

Figure 2:
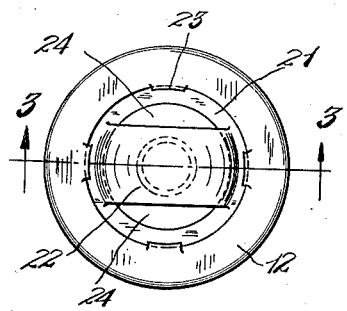
Fig. 2 is a plan view of the inner end or base of a valve stem embodying the present invention.
Figure 1:
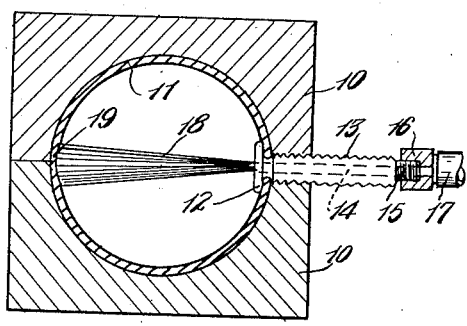
Figure 1 is a diagrammatic sectional view illustrating a tire tube in a curing mold and showing how the ordinary valve stem allows a jet or concentrated stream of high-pressure air or steam to strike the tube directly opposite the inner end of the stem and to thus cause a thin spot in the tube.
Figure 3:
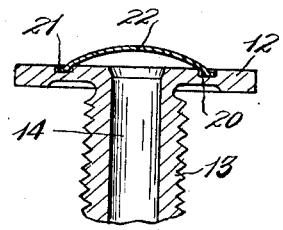
Fig. 3 is a fragmentary sectional view taken substantially on line 3—3 of Fig. 2, looking in the direction of the arrows.
Figures 4, 5:
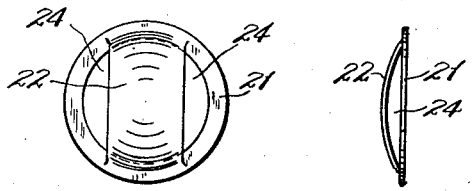
Fig. 4 is a detail plan view of the deflector shown mounted on the base of the valve stem in Figs. 2 and 3.
Fig. 5 is a detail side elevational view of the deflector shown in Fig. 4.

In Fig. 1 of the drawing there is illustrated in section the two halves 10 of a mold in which is arranged the molded tube 11 having the base 12 of the valve stem 13 molded therein. The valve stem is provided with a bore 14 therethrough and with a reduced nipple 15 at its outer end, as is usual in valve stem construction. When the fitting 16 of an air line 17 is applied to the reduced nipple 15 of the valve stem and high-pressure fluid injected into the tube 11 to cure the same, a forceful jet 18 of said fluid will leave the inner end of the valve stem bore at the base of the stem and strike against the tube directly opposite the base and cause, as previously mentioned, a thin spot such as is indicated at 19 in Fig. 1.

In accordance with the present invention it is contemplated to provide a valve stem having a base so formed as to cause the pressure fluid leaving the valve stem bore to be diffused as distinguished from being concentrated in a stream or jet and in this way eliminate the formation of thin spots in the tire tube.

The face of the base 12 of the valve stem 13 which will lie interiorly of the tube is provided with an annular groove 20 arranged concentrically with respect to the inner end of the valve stem bore. A deflector, formed of metal or other similar material and having a circular rim 21 provided with a diametrically extending and outwardly bowed connecting portion 22, is arranged in the groove 20 and may be held therein by portions 23 of the base peened over into engagement with the rim 21.

It will be seen that the deflector may be economically and conveniently stamped from thin gauge sheet metal and that the groove 20 may be provided in the base by simple machining operations, thus effecting substantially no increase in the cost of the valve stem. A valve stem having such a deflector secured in its base will eliminate the creation of thin spots in the tube due to the concentrated jet or stream of pressure fluid striking the tube, since the jet strikes the cross-portion 22 of the deflector and the pressure fluid entering the tube is diffused through the openings 24 lying between the portion 22 and the rim 21 of the deflector.

Valve stems equipped with the present invention result in reducing the number of tire tubes which must be either discarded or rated as seconds because the tubes have thin spots therein and thus enable a more economical and efficient manufacture of tubes, as well as the provision of tubes which will be stronger and therefore capable of providing greater service in actual use. It will be understood that the deflector remains in position on the valve stem base after the tube is manufactured and during the use of the same.

Figure 6:
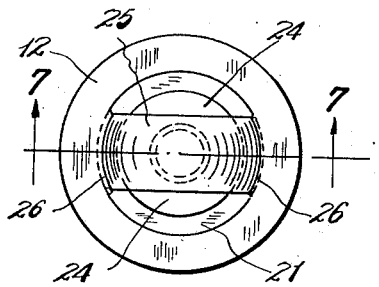
Fig. 6 is a plan view of the inner end or base of a valve stem embodying a modified form of the invention from that shown in Figs. 2 to 5, inclusive.
Figure 7:
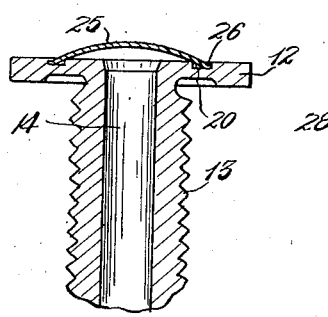
Fig. 7 is a fragmentary sectional view taken substantially on line 7—7 of Fig. 6, looking in the direction of the arrows.

In Figs. 6 and 7 there is shown a slightly modified form of invention from that previously described, in that the deflector is a bowed strip 25 the opposite ends of which are located in the groove 20 and held in position by peened-over portions 26 of the valve stem base.

Figure 8:
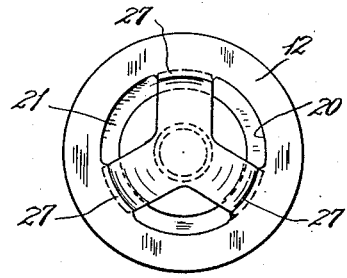
Fig. 8 is a plan view of the inner end or base of a valve stem embodying a modified form of invention from those shown in the previously referred to figures.

In Fig. 8 there is illustrated a still further modified form of the invention wherein the deflector may be substantially Y-shaped and have its extremities arranged in the groove 20 and held therein by peened-over portions 27 of the valve stem base, it being understood that intermediate the extremities the deflector is outwardly bowed so as to have its central portion spaced outwardly from the inner end of the valve stem bore.

Figures 9, 10:
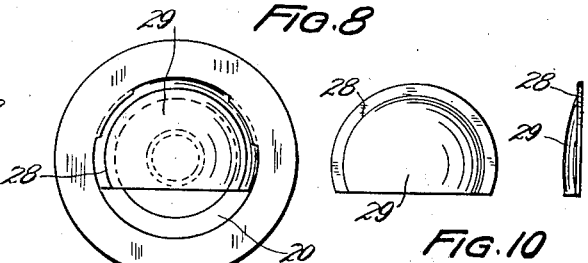
Fig. 9 is a plan view of the inner end or base of a valve stem embodying a still further modified form of the invention from those previously shown.
Fig. 10 is a detailed plan and side view of the deflector shown in Fig. 9.

In the form shown in Figs. 9 and 10 the deflector is formed so as to allow the pressure fluid to have exit in one direction only and would have especial utility in connection with the steam method of curing tire tubes wherein it is desirable to have the steam circulate in the tube in one direction. The deflector is shown as a segment of a circle and has an arcuate rim 28 to interfit the groove 20 in the valve stem base and a central outwardly bowed portion 29 which overlies the inner end of the valve stem bore. The deflector is secured in the groove 20 by peened over portions of the base, as in the previously described forms.

Although several embodiments of the invention have been illustrated and described herein, it should be understood that the invention is susceptible of various modifications and adaptations within the scope of the appended claims.

Having thus described my invention, I claim:

1. A valve stem having a base at its inner end provided on its inner face with an annular groove, a bore extending through the stem having an unobstructed portion terminating centrally of the inner face of the base, and deflecting means carried by said base and having a portion spaced outwardly from and overlying the inner end of the bore and of a width greater than the diameter of said bore but less than the diameter of said base, said deflecting means also having portions located in said annular groove, said base having peened-over portions adjacent said groove for holding said deflecting means assembled therewith.

2. A valve stem having a base at its inner end provided with an annular groove, a bore extending through the stem having an unobstructed portion terminating centrally of the inner face of the base, and deflecting means comprising a ring interfitting said groove and a portion connected to said ring and extending across but spaced outwardly from the inner end of the bore and of a width greater than the diameter of said bore but less than the diameter of said base, said base having peened-over portions retaining said ring in said groove.

JOHN C. CROWLEY.